United States Patent [19]
Bambara et al.

[11] Patent Number: 4,836,814
[45] Date of Patent: Jun. 6, 1989

[54] MULTICOLORED FOAM AND METHOD FOR MAKING

[75] Inventors: John D. Bambara, Osterville, Mass.; Charles E. Flathers, Jr., Diablo, Calif.; Dennis A. Knaus, West Barnstaple, Mass.; Gregory G. Palmieri, Fresno, Calif.

[73] Assignee: Packaging Industries Group, Inc., Hyannis, Mass.

[21] Appl. No.: 118,986

[22] Filed: Nov. 10, 1987

[51] Int. Cl.$^4$ .............. B29C 67/22; B29C 47/04; C08J 9/14

[52] U.S. Cl. .................. 441/65; 156/216; 264/40.7; 264/45.3; 264/50; 264/53; 264/54; 264/75; 264/138; 264/148; 264/211; 264/DIG. 5; 425/4 C; 425/145; 425/159; 425/817 C; 441/68; 441/74; 441/129; 521/82

[58] Field of Search .......... 264/45.5, 75, 53, 73, 264/78, 40.7, 50, 54, 138, 148, 45.3, 211, DIG. 5; 425/145, 159, 817 C, 4 C; 441/65, 68, 129, 74; 521/82

[56] References Cited

U.S. PATENT DOCUMENTS

| | | |
|---|---|---|
| 2,174,779 | 10/1939 | Delorme . |
| 2,387,730 | 10/1945 | Alderson, Jr. et al. .......... 264/50 X |
| 2,450,436 | 10/1948 | McIntire ................ 264/53 |
| 2,515,250 | 7/1950 | McIntire ................ 264/53 X |
| 2,740,157 | 4/1956 | McCurdy et al. ............ 264/53 |
| 3,067,147 | 12/1962 | Rubens et al. ............ 264/53 X |
| 3,413,387 | 11/1968 | Ohsol ................ 264/46.3 X |
| 3,413,388 | 11/1968 | Lux et al. ............ 264/46.2 X |
| 3,422,175 | 1/1969 | Rowland ................ 264/75 |
| 3,431,163 | 3/1969 | Gilbert ................ 264/53 X |
| 3,431,164 | 3/1969 | Gilbert ................ 264/53 X |
| 3,769,380 | 10/1973 | Wiley ................ 264/40.6 |
| 3,954,929 | 5/1976 | Hoenke ................ 264/51 |
| 3,966,381 | 6/1976 | Suh ................ 425/376 |
| 4,011,292 | 3/1977 | Randall ................ 264/75 |
| 4,125,582 | 11/1978 | Langlois ................ 264/75 |
| 4,128,386 | 12/1978 | Wissinger et al. ............ 264/171 X |
| 4,128,689 | 12/1978 | Heaps et al. ............ 264/75 X |
| 4,383,955 | 5/1983 | Rubio et al. ............ 264/46.6 |
| 4,457,729 | 7/1984 | Peerlkamp ............ 264/46.6 |

FOREIGN PATENT DOCUMENTS

| | | |
|---|---|---|
| 251057 | 1/1963 | Australia ................ 264/46.6 |
| 451864 | 10/1948 | Canada . |
| 54-124072 | 9/1979 | Japan ................ 264/75 |

OTHER PUBLICATIONS

*Surfer*, vol. 24, No. 6, Jun. 1983, p. 10.
*Surfer*, vol. 24, No. 11, Nov. 1983, Back Cover.
*Surfer*, vol. 24, No. 12, Dec. 1983, p. 19.
*Surfer*, vol. 25, No. 6, Jun. 1984, p. 18.

*Primary Examiner*—Philip E. Anderson
*Attorney, Agent, or Firm*—Berman, Aisenberg & Platt

[57] ABSTRACT

A multicolored foam product and a method for the preparation thereof. Heat-plastified foamable gel of a thermoplastic resin or resins containing blowing agents are combined with different coloring materials added sequentially and extruded through an orifice of a die which is extended in length to facilitate laminar flow in the resin. This resin is expanded to form a multicolored layered foam product, such as multicolored foam planking, in a single extrusion. Multicolored foam planking produced is suitable for use as the body material for surfboards, body boards, and other recreational products.

17 Claims, 1 Drawing Sheet

MULTICOLORED FOAM AND METHOD FOR MAKING

FIELD OF THE INVENTION

This invention relates generally to a method for the manufacture of colored thermoplastic foams and more particularly to extrusion of multicolored thermoplastic foams.

BACKGROUND OF THE INVENTION

Foams of thermoplastic resins, such as, for example, polystyrene and polyethylene, are useful industrial products because of their excellent heat insulating, cushioning and other properties. These foams have found acceptance over the years in such applications as thermal insulation and cushioning and as raw materials for the fabrication of various shaped articles.

The preparation of thermoplastic foams by extruding a heat-plastified mixture of thermoplastic resin and a blowing agent is well known in the art and is described in U.S. Pat. Nos. 2,740,157; 3,067,147; 3,413,387; 3,413,388; 3,431,163; 3,431,164; 3,954,929; and 3,966,381, and Canadian Pat. No. 451,864, as well as in other literature pertaining to the art.

U.S. Pat. No. 2,450,436 discloses a method for the preparation of cellular thermoplastic products in which a solid thermoplastic resin, e.g., polystyrene, and a normally gaseous agent such as methyl chloride, methyl ether, propylene, or butylene are held in a closed vessel under pressure at a temperature below the critical temperature of the normally gaseous agent until a homogeneous mobile gel is obtained. Thereafter, an outlet is opened to permit flot of the gel from the vessel. During flow of the mobile gel from the pressurized vessel into a zone of lower pressure, the resin is swollen by vaporization and expansion of the dissolved volatile substance to form a stable cellular product consisting for the most part of individual closed, thin-walled cells.

U.S. Pat. No. 2,515,250 described a method of forming a mixture of a normally gaseous agent and a thermoplastic resin under pressure, and storing the mixture by feeding it into a pressurized storage vessel in which it is maintained at a desired temperature until a homogeneous mobile gel or solution is obtained prior to extrusion and expansion of the resin.

U.S. Pat. No. 3,067,147 discloses a method for the preparation of a cellular mass from thermoplastic resins by incorporating in the material to be foamed a gas or volatile organic liquid with a thermoplastic resin, the latter then being heated to a temperature at which it becomes plastic, whereby vapors of gas or volatile liquid expand the softened resin to form a cellular mass.

U.S. Pat. No. 2,387,730 teaches the making of cellular polyethylene by impregnating a molten polymer with a gas which is soluble therein under pressure, then partially releasing the pressure while maintain the temperature to expand the polymer and cooling the expanded polymer.

U.S. Pat. No. 2,174,779 to Delorme describes apparatus for extruding various colored plastics in which a predetermined design is obtainable by feeding different colors of plastic material through an extruder. Foam materials are not disclosed.

The patent to Wiley, U.S. Pat. No. 3,769,380, also describes a method for extruding synthetic thermoplastic sheet material having a varigated colored pattern. The method describes means for obtaining a variagated pattern, advantageously a wood-grain pattern, in the formation of non-foamed multicolored plastics.

Randall, U.S. Pat. No. 4,011,292, describes a method for producing sheet material with a multicolor striated pattern and Wissinger, U.S. Pat. No. 4,128,386, describes an apparatus for the extrusion of patterns sheets or panels of thermoplastic synthetic resin compositions. Neither of these two paterns describes a method for making multicolored foam materials.

The foregoing noted patents indicate that formation of variegated, multicolored plastics is known, but does not appear to have been extended to application to foam materials. To date, foam products have been made by fabrication from individual pieces of single-color foamed materials.

SUMMARY OF THE INVENTION

This invention relates to a method for manufacturing colored and multicolored thermoplastic foam and articles made therefrom. Multicolored foams produced in accordance with this invention generally have improved esthetics, strength and durability. Because the new multicolored thermoplastic foams are produced in a single operation, the costs are substantially less than those made by a secondary lamination process. Moreover, according to the process described, changeover between colors is fast, essentially eliminating waste when changing color. A multicolored foam product is made without lamination of differently colored layers, the colored layers being produced in a unitary foam body.

These benefits and other advantages are achieved by the preparation of a multicolored thermoplastic foam in a continuous manner wherein the foam passes through a heated pliable state to a cooled set state during preparation. At least two colors, and up to ten or more colors, of heat-plastified foamable gels may be combined and simultaneously extruded through the same die orifice. Various combinations of colored layers are possible in a single extrusion. These products may be modified further by cutting, laminating or stacking.

It is an object of the invention to provide a multicolored foam product in a single extrusion.

It is another object of the invention to provide a process for extruding multicolored foams.

It is a further object of the invention to provide a surfboard or other recreational board having a multicolored foam body.

DETAILED DESCRIPTION OF THE INVENTION

Figure 1:
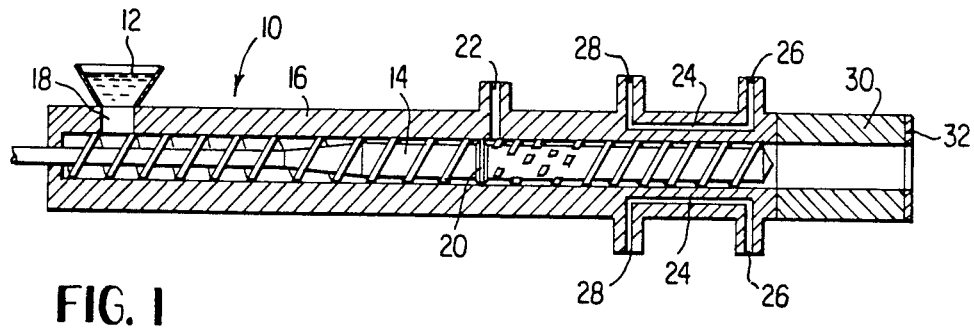
FIG. 1 is a schematic cross section of an apparatus for practicing the invention.

Although any extrudable, foamable composition of synthetic resinous material may be used, a normally solid thermoplastic polymer resin is preferred. Exemplary preferred polymers include the organic addition polymers of the following monomers:

Aliphatic α-monoolefins, such as ethylene, propylene, butene-1, and isobutene; vinyl halides, such as vinyl chloride and vinylidene chloride; esters of α,β-ethylenically unsaturated carboxylic acid such as ethyl acrylate, methylmethacrylate, and diethyl maleate; vinyl esters, such as vinyl acetate; monovinylidene aromatic carbocyclic monomers, such as styrene; α-methyl styrene, ar-chlorostyrene, and ar(t-butyl)-styrene; α, β-ethylenically unsaturated carboxylic acids, such as acrylic acid, methacrylic acid, itaconic acid and fumaric acids. Also included are copolymers of the above-named monomers, such as ethylene/propylene copolymers, ethylene/vinyl acetate copolymers, ethylene/acrylic copolymers and the like. Also suitable are the cellulosic polymers such as methyl cellulose and ethyl cellulose; polyamides, such as nylon; polyesters, such as polyethylene terephthalate, polycarbonates and the like. Blends of the above-named polymers and copolymers are also included; especially preferred thermoplastic polymers are polyethylenes, ethylene/vinyl acetate copolymers, ethylene/acrylic acid copolymers, ethylene/methyl acrylic acid copolymers, ionnomer salts of such acid copolymers, polyvinyl chlorides, and polystyrenes.

The above polymers or blends of polymers that are substantially cross-linked are also suitable.

There are many normally gaseous elements, compounds or mixtures thereof that can be used as a physical blowing agent to produce cellular plastic products. Among the elemental gases that might be employed with satisfactory results are nitrogen, argon, neon, and helium.

In addition, normally gaseous organic compounds may be used to expand the plastic material. Among the most important of these are the halogen derivatives of methane and ethane, which are used as refrigerants and for similar purposes, such as chlorodifluormethane, dichlorodifluoromethane, dichlorofluoromethane, difluorochloroethane, difluorotetrachloroethane, dechlorotetrafluoroethane defluorochloroethane, 1,1,-difluoroethane, ethylchloride, methyl bromide, methyl chloride, trichlorofluoromethane, octofluorocyclobutane, monochloropentafluoroethane, and the like; mixtures of any two or more of the above.

Other normally gaseous compounds that may be employed are acetylene, ammonia, butadiene, butane, butene, carbon dioxide, cyclopropane, dimethylamine, 2,2,-dimethylpropane, ethane, ethylamine, ethylene, isobutylene, methane, monomethylamine, propane, propylene, and trimethylamine.

All of the aforementioned materials are intended to be embraced within the term normally gaseous, expanding medium as used herein. This term is intended to mean that the expanding medium employed is a gas at the temperatures existing under the normal operation conditions of a plastic extruder. Also, when reference is made to the introduction of a normally gaseous, expanding medium or a gas into a plastic compound in an extrusion cylinder, it is to be understood that, while the material introduced is a gas at the normal operating temperature of the extruder, it may be in either the gaseous or the liquid state at the temperature and pressure at which it is introduced into the extrusion cylinder because it is easier to pump a liquid under constant pressure and volume than it is to supply a gas under constant pressure and volume.

Examples of liquid which may be used as physical blowing agents include hydrocarbons, such as pentane, hexane, heptane, octane; unsaturated hydrocarbons, such as pentene, 4-methyl pentene, hexane; petroleum ester fractions; ethers such as dethyl ether; alcohols such as methanol or ethanol; ketones such as acetone or methylethyl ketone; and halogenated hydrocarbons such as carbon tetrachloride, chloroform, ethylene dichloride, methylene chloride, of 1,1,3-trichloro-1,2,2,-trifluoroethane.

Other blowing agents that can be used but are not as effective at producing lower densities are the chemical blowing agents that decompose at the extrusion temperatures to liberate gases. The gases liberated by these blowing agents are usually nitrogen, carbon monoxide, carbon dioxide, and ammonia. Some chemical blowing agents will liberate all of the gases previously mentioned while others may only release one type of gas. Examples of chemical blowing agents include azodicarbonamide, p-toluene sulfonyl semicarbazide, p,p-oxybis benzene sulfonyl hydrazide, p-toluene sulfonyl hydrazide, dinitroso penta methylene and the like.

Blowing agents are usually incorporated in amounts from about 0.05 to about 55 percent by weight based on the polymer. Other ingredients such as fillers, antioxidants, anti-static agents, nucleation agents and the like may also be present in the polymer gel.

Foamable compositions of the above-named polymers, blowing agents and additives are well known in the art and a representative sample of such compositions is set forth in the previously mentioned patents, the teaching of which are incorporated herein by reference thereto.

In the practice of the present invention, thermoplastic foams having a cross-sectional area of any geometric configuration may be extruded. The geometric configuration of the thermoplastic foam may be varied along the length of a given product.

With reference to the drawings, in which like numerals represent like parts, FIG. 1 shows extruder 10 including hopper 11 on which a resin feeder 12 such as a weight belt feeder, rotary feeder, screw auger, or other feeder is mounted. Polymer in suitable granular form is fed from resin feeder 12 into the extruder where it is pressed by forward rotating screw 14 mounted for rotation in barrel 16. Coloring material is added either manually or automatically at location 18. For example, the coloring material may be fed in from one side by a screw feeder or other known feeder.

Figure 2:
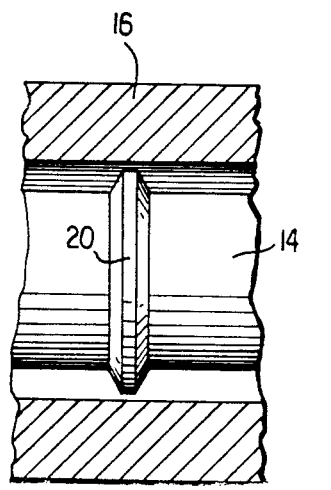
FIG. 2 is a detail of a sealing blister used in the apparatus of FIG. 1.

Heating zones are provided by surrounding extruder barrel 16 with conventional electric heaters with suitable temperature controls and instrumentation, as known to one skilled in the art. After compression and melting, the molten polymers pass around sealing blister 20, the sealing blister forming a plastic seal against countercurrent flow of gas or vapors back through the barrel of the extruder. FIG. 2 shows a detail of a sealing blister 20 around which the resin melt passes.

Inlet 22 is provided for the introduction of physical blowing agent into barrel 16. The blowing agent is fed under pressure through inlet 22 to form an admixture with the molten polymer in barrel 16. The admixture is mechanically agitated, thoroughly mixed, and brought to a uniform temperature throughout its mass. As a means of achieving the desired temperature control, barrel 16 is surrounded for a given length by passage 24 through which a heat transfer medium, such as steam, water, air, gas or oil may be circulated. Finally, the admixture in the form of a gel is fed through a passage into a die 30 where it is combined and extruded through the die orifice 32 into a zone of lower pressure, such as the atmosphere, where the gel expands to form a cellular body.

Another method of foaming the polymer is by using a chemical blowing agent which is introduced into extruder 10 together with the resin. The solid polymer resin and chemical blowing agent are conveyed through extruder 10 by feedscrew 14. As the polymer and chemical blowing agent are conveyed the polymer becomes molten and the chemical blowing agent begins to decompose and liberate gases. The gases form an admixture with the molten polymer which is mechanically agitated, thoroughly mixed, and brought to a uniform temperature throughout its mass. Finally, the gel mass is fed through die 30 and extruded through die orifice 32 into a zone of lower pressure, such as the atmosphere, where the gel mass expands to form a cellular body.

In prior known methods for coloring foamed thermoplastic material, such as polyethylene, coloring material is added into and mixed with the resin feed in a hopper and the color is kept constant, a colored extrudate being emitted through die 30.

Figure 3:
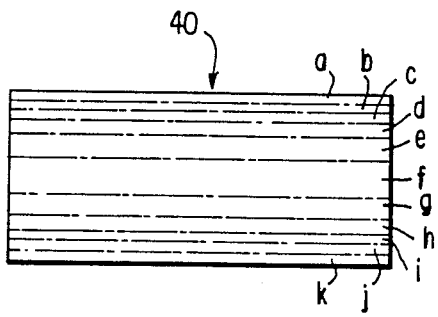
FIG. 3 is an end view of a section of foam planking product showing a plurality of differently colored layers.

According to the present invention, a multicolored foam product such as foam block 40 shown in FIG. 3, having continually changing colors, may be produced. The colors are not held in constant formation, but the change in color depends on adding fresh coloring material, of the same or a different color at the same time as the resin is added. In a preferred method of the invention, resin is fed to extruder 16 by a feeder 12 which feeds resin to the extruder at 18. Coloring materials are added sequentially to the resin at 18, preferably by means of color concentrate dispersed in resin, but optionally as powdered or liquid color. Block 40 is extruded showing colored layers a to k, as shown in FIG. 3. Other configuratoins of a different number of layers may be produced.

According to the principles of laminar flow, the resin at the outside edges of a flowing mass moves more slowly than resin in the center of the flowing body. Thus, colored material will move more rapidly through the center of die 30 than through the edges of the die. Die 30 may be, in non-limiting examples, 1 to 10 inches in internal diameter and 12 to 144 inches in length, or other appropriate combination of dimensions sufficient to allow a multicolor effect to develop in the interior of die 30. Longer lengths of die 30 allow a more pronounced layered and streaked effect to be produced in the foamed extrudate. Laminar flow in die 30 results in portions at the center of the die flowing faster than portions at the edge of the die, and thus plank 40 shows colors added first at the edges of the plank, and colors added later at the center of the plank. Die 30 has a cross-section selected according to the required shape of the product extruded at lips 32, for example, die 30 has parallel lips for producing rectangular planking, circular lips for producing cylindrical extrudate, or the orifice of the lips may be an irregular shape known to one skilled in the art.

The method of the invention if particularly suitable for extruding planks or solid foam rounds having variable color configurations through the cross-section of the extrudate. When the extrudate leaves the extruder, the coloring material stays in place during the post-die foaming process.

In an example of the invention, resin pellets of low density polyethylene and a flourocarbon foaming agent such as "FREON" are fed to the extruder and portions of color concentrate (20 to 60 pounds color in 80 to 40 pounds resin) are added at discrete intervals to the feed, to produce multicolored polyethylene foam.

In a non-limiting example, 2-tablespoon portions of red color concentrate followed by yellow, yellow, blue, yellow, yellow, red portions at regular 1 minute intervals are added with the resin pellet feed and a multicolored foam plank suitable for use as a surf board or body board or other foam product is extruded. The main color of the core is red and the core is substantially striped red, orange, yellow, green, blue, green, yellow, orange, red in successive layers to the center. The striped effect appears in layers due to laminar flow since the edge portions move more slowly through die 30 than the interior portions, and the outermost layer, which moves slowest, may be substantially gray, formed by a mixing of all the colors. The extruder is run at a normal speed, known to one skilled in the art, but may be varied to produce special color effects. A greater streaked effect is produced by extending the length of die 30.

Figure 4:
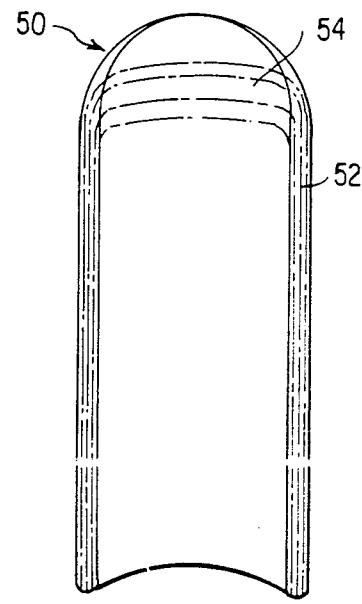
FIG. 4 is a bottom plan view of a surfboard having a multicolored foam body.

In a typical use for colored planking, surf boards or body boards, such as board 50 shown in FIG. 4, are made with a multicolored foam body of the invention. Board 50 does not necessarily need side rails applied to cover the edges of the body. The multi-colored foam core of the invention forming the body of the surfboard has a decorative cut edge 52 showing the layered changes of color. Moreover, the board may be contoured, for example, on the lower deck at the front end of board, and as the material is shaved away, the color of each successive layer appears on contoured surface 54. The colors may, for example, appear as bands of color, which may be either straight or curved.

Because the coloring material is added locally to the extruder at 18, only the resin entering from feeder 12 at the same time as the color concentrate is colored. The color combinations may be varied at will according to the colors added. The coloring material may be added manually or automatically. Single colored extrudate may be obtained by adding a succession of color concentrate portions at intervals, as described above, where all the color concentrate portions are the same color.

If required, a surfboard having a multicolored foam body, such as is shown in FIG. 4, may also have heat laminated skins applied as side rails, end rail, top deck and/or bottom deck skins, as is known in the art, according to the decorative effect required.

Multicolored planks of any size and shape may be made, including solid core rounds, ovals, etc., by varying the shape of die 30. Extruded, foamed product is cut to the size and shape required.

Other uses, besides body boards, surfboards, snow sleds, etc., will be apparent to one skilled in the art. A product made according to the process of the invention may be used in any application using foamed material. Non-limiting examples include exercise mats, swim floats, insulating material, sail boards, snow skis, surf skis, life jackets, etc.

While the invention has been described above with respect to certain embodiments thereof, it will be appreciated that variations and modifications may be made without departing from the spirit and scope of the invention.

What is claimed is:

1. A surfboard or body board comprising a multicolored foam body wherein the foam body comprises a plurality of differently colored adjacent parallel layered portions in a substantially homogeneous single extruded plank of foam.

2. A surfboard of claim 1 wherein the colors of adjacent layered portions are displayed on a cut edge of the board.

3. A surfboard of claim 1 wherein colors of layered portions are displayed on a bottom surface of the board by exposing a cut portion of the cross-section of the board.

4. A surfboard of claim 2 wherein portions of said cut edges are covered with heat-laminated edge strips.

5. A surfboard of claim 4 wherein a tail portion of said cut edges is covered with a heat-laminated strip.

6. A process for making a multicolored thermoplastic body comprising:

feeding a thermoplastic resin to a resin hopper of an extruder, sequentially adding at timed intervals a plurality of separate coloring materials to the resin to form a multi-colored resin, conveying the colored resin through a screw of an extruder, passing the colored resin through elongated die means for facilitating laminar flow, and passing through die lips which comprise an exit orifice to form a single body of multi-colored resin having edge portions colored by an earlier added coloring material and having center portions colored by one or more of said coloring materials added sequentially later than the said earlier added coloring material, whereby the body is characterized by inclusion of differently colored layers integrally formed in the body of multi-colored resin.

7. A process for making a multicolored thermoplastic foam body comprising:

feeding a thermoplastic resin to a single resin hopper of an extruder, sequentially adding at timed intervals a plurality of separate coloring materials to the resin to form a multi-colored resin, adding blowing agent to the resin, conveying the multi-colored resin through a screw of the extruder;

passing the multi-colored resin through elongated die means for facilitating laminar flow, passing the multi-colored resin through die lips which comprise an exit orifice to form a single body of multicolored resin having edge portions colored by an earlier added coloring material and having center portions colored by one or more of said coloring materials added sequentially later than the said earlier added coloring material, and foaming the multi-colored resin to form multi-colored foam.

8. A process of claim 7 wherein the multicolored resin is passed through elongated lips for forming foamed planking.

9. A process of claim 7 wherein the multicolored resin is passed through circular die lips for forming foamed cylindrical planking.

10. A process of claim 7 further comprising cutting the foamed product into lengths.

11. A process of claim 7 further comprising cutting the foam body to the shape of a surfboard or body board.

12. A process of claim 8 further comprising cutting the foam body to the shape of a recreational product.

13. An extruded single thermoplastic product comprising a multicolored foam body having layers of differently colored foam manufactured by a process of claim 7.

14. A product of claim 13 wherein the foam comprises adjacent layered portions of different colors.

15. A product of claim 13 comprising multicolored foam planking having a substantially rectangular cross-section.

16. A product of claim 13 comprising multicolored foam having a substantially circular cross-section.

17. A surfboard or body board comprising a multicolored foam body made by the process of claim 1.

* * * * *